US012427684B2

(12) United States Patent
Peng et al.

(10) Patent No.: US 12,427,684 B2
(45) Date of Patent: Sep. 30, 2025

(54) ROLLER TOOL AND ROLLER VEGETABLE CUTTER

(71) Applicant: Zhongshan Songtai Electrical Appliances Co., Ltd, Guangdong (CN)

(72) Inventors: Gangzheng Peng, Guangdong (CN); Guangmiao Zhang, Guangdong (CN)

(73) Assignee: Zhongshan Songtai Electrical Appliances Co., Ltd, Zhongshan (CN)

( * ) Notice: Subject to any disclaimer, the term of this patent is extended or adjusted under 35 U.S.C. 154(b) by 290 days.

(21) Appl. No.: 18/195,326

(22) Filed: May 9, 2023

(65) Prior Publication Data

US 2024/0109216 A1 Apr. 4, 2024

(30) Foreign Application Priority Data

Sep. 30, 2022 (CN) ......................... 202222623834.0
Sep. 30, 2022 (CN) ......................... 202222625984.5

(51) Int. Cl.

| | |
|---|---|
| ***B26D 3/26*** | (2006.01) |
| ***B26D 1/00*** | (2006.01) |
| ***B26D 5/10*** | (2006.01) |
| ***B26D 7/18*** | (2006.01) |
| ***B26D 7/26*** | (2006.01) |

(52) U.S. Cl.

CPC ............. *B26D 3/26* (2013.01); *B26D 1/0006* (2013.01); *B26D 5/10* (2013.01); *B26D 7/18* (2013.01); *B26D 7/2614* (2013.01); *B26D 2001/0033* (2013.01); *B26D 2210/02* (2013.01)

(58) Field of Classification Search

CPC ................................ A47J 43/25; A47J 43/255
See application file for complete search history.

(56) References Cited

U.S. PATENT DOCUMENTS

| | | | | |
|---|---|---|---|---|
| 5,702,061 A * | 12/1997 | Kennedy | ............... | A47J 43/255 241/273.3 |
| 6,244,529 B1 * | 6/2001 | Tardif | ................... | A47J 43/255 241/273.3 |
| 2014/0014751 A1 * | 1/2014 | Sampaio | ............... | A47J 43/255 241/93 |

* cited by examiner

*Primary Examiner* — Mohammed S. Alawadi
(74) *Attorney, Agent, or Firm* — Hemisphere Law, PLLC; Zhigang Ma

(57) ABSTRACT

Disclosed is a roller tool, comprising a roller body, wherein the roller body is a cylindrical structure, and comprises a roller bottom surface and a roller side face, a discharge cavity is defined by the roller bottom surface and a roller side face, an end, opposite to the roller bottom surface, of the roller body is open to form an outlet, a connecting part protruding towards the outlet is disposed in a middle of the roller bottom surface, and multiple mounting parts are disposed on the roller side face; multiple blade assemblies, wherein the multiple blade assemblies are detachably mounted in the multiple mounting parts; a guide part, wherein the guide part is disposed in the discharge cavity. the guide part is disposed in the roller body and is located on the same axis as the roller body.

16 Claims, 6 Drawing Sheets

ROLLER TOOL AND ROLLER VEGETABLE CUTTER

CROSS REFERENCE TO RELATED APPLICATIONS

The present application claims the benefit of Chinese Patent Application Nos. 202222623834.0 and 202222625984.5 filed on Sep. 30, 2022. All the above are hereby incorporated by reference in their entirety.

TECHNICAL FIELD

The invention belongs to the technical field of kitchenware, and particularly relates to a roller tool and a roller vegetable cutter.

DESCRIPTION OF RELATED ART

With the improvement of people's demand for cooking, roller vegetable cutters which are flexible and easy to operate and high in vegetable cutting efficiency are preferred and have been widely used. The roller vegetable cutters, as tools capable of cutting vegetables quickly, can easily shred or chop vegetables, or cut vegetables according to other required sizes or shapes.

Wherein, the roller tool is the key part that determines the cutting efficiency of the roller vegetable cutters. At present, the roller tool of many roller vegetable cutters on the market does not have a guide function, so vegetables cannot be discharged in time after being cut, which reduces the cutting efficiency of the roller vegetable cutters.

Moreover, to ensure that blades can be changed easily, most roller tools on the market adopts a separable design by clamping blade assemblies on a roller body, and the separable design that the blade assemblies are slidably clamped on the roller body is widely used. However, by adopting such a design, the positions where the blade assemblies are slidably clamped on the roller body may be abraded after long-term use, making it impossible to normally clamp the blade assemblies on the roller body anymore and affecting normal use of the roller tools.

BRIEF SUMMARY OF THE INVENTION

The main objective of the invention is to provide a roller tool and a roller vegetable cutter to improve vegetable discharge capacity of the roller tool and solve the problem that blade assemblies slidably clamped on a roller body may fall due to abrasion.

In one aspect, the invention provides a roller tool, comprising a roller body, wherein the roller body is a cylindrical structure, and comprises a roller bottom surface and a roller side face, a discharge cavity is defined by the roller bottom surface and a roller side face, an end, opposite to the roller bottom surface, of the roller body is open to form an outlet, a connecting part protruding towards the outlet is disposed in a middle of the roller bottom surface, and multiple mounting parts are disposed on the roller side face;

multiple blade assemblies, wherein the multiple blade assemblies are detachably mounted in the multiple mounting parts, lower ends of the blade assemblies are clamped at ends, close to the outlet, of the mounting parts, second mounting surfaces are disposed at upper ends of the blade assemblies, first clamping parts are disposed at two ends of each said second mounting surface, clamping protrusions are disposed on the first clamping parts, blade holder mounting surfaces are disposed on an inner wall of the roller bottom surface, clamping grooves are formed in two sides of each said blade holder mounting surface, and the blade assemblies are mounted on the roller body through the cooperation of the clamping protrusions and the clamping grooves; and a guide part, wherein the guide part is disposed in the discharge cavity and connected to the connecting part and is a hemispherical or cylindrical structure, and the guide part and the roller body are located on a same axis.

In a preferred solution of the invention, the guide part is provided with a cavity, which allows the connecting part to be clamped therein and gives way to the connecting part, a plurality of first clamping recesses are formed in an upper portion of an inner wall of the cavity, a plurality of first clamping parts are disposed on an outer wall of the connecting part, and the guide part is connected to the connecting part through the cooperation of the first clamping recesses and the first clamping parts.

In a preferred solution of the invention, each said blade assembly comprises a blade holder and a blade, a cutting notch with a height difference is formed in a middle of the blade holder, the blade is mounted in the cutting notch, and a length of the cutting notch matches that of the blade.

In a preferred solution of the invention, wherein an oblique first mounting surface is formed on an upper surface of the cutting notch, a plurality of clamping protrusions used for mounting the blade are disposed on the first mounting surface, a plurality of mounting holes are formed in the blade, and the blade is mounted and fixed on the first mounting surface through the cooperation of the clamping protrusions and the mounting holes.

In a preferred solution of the invention, a limit protrusion is disposed in a middle of an end, close to the outlet, of each said mounting part, a notch matched with the limit protrusion is formed in an end of each said blade holder, and protrusive parts abutting against an inner wall of the roller side face of the roller body are disposed on two sides of the notch respectively.

In a preferred solution of the invention, the blade holder mounting surfaces are disposed on the inner wall of the roller bottom surface, guide slots are formed in two sides of each said blade holder mounting surface respectively, and clamping grooves are formed in the guide slots.

In a preferred solution of the invention, third mounting surfaces are disposed on two sides of each said mounting part, and abut against two side edges of the corresponding blade holder to support and limit the blade holder.

In a preferred solution of the invention, a mounting groove allowing a rocker arm assembly of a roller vegetable cutter to be clamped therein is formed in the roller bottom surface, and the mounting groove is a cross-shaped structure.

In a second aspect, the invention provides a roller vegetable cutter using the roller tool.

One of the above technical solutions of the invention has at least one of the following advantages or beneficial effects:

In the invention, the guide part is disposed in the roller body and is located on the same axis as the roller body, such that cut vegetables can smoothly fall to the surface of the guide part from any angles; due to the fact that the guide part is a hemispherical or cylindrical structure, such that vegetables can fall out of the outlet of the roller body along the arc-shaped surface of the guide part, thus improving the vegetable discharge capacity of the roller tool and the cutting efficiency of the roller vegetable cutter; the blade assemblies are detachably mounted on the mounting parts on the roller side face, thus being easy to change;

Moreover, multiple mounting parts are disposed on the side face of the roller body, the blade assemblies are detachably mounted on the mounting parts and can be separated from the roller body, such that the blades can be changed easily when damaged, and different blade assemblies can be disposed on the roller body to form roller tools with different functions; the lower ends of the blade assemblies are clamped at the ends, close the outlet, of the mounting parts, and the second mounting surfaces at the upper ends of the blade assemblies are clamped with the blade holder mounting surfaces on the inner wall of the roller bottom surface through the clamping protrusions and the clamping grooves to connect the blade assemblies to the roller body and, such that the problem that, when blade assemblies slidably clamped on a roller body, the positions where the blade assemblies are slidably clamped on the roller body may be abraded after long-term use, so the blade assemblies cannot be normally clamped on the roller body anymore and may fall, thus affecting normal use of the roller tool is solved.

BRIEF DESCRIPTION OF THE SEVERAL VIEWS OF DRAWINGS

To more clearly explain the technical solutions of the embodiments of the invention or the prior art, drawings used for describing the embodiments of the invention or the prior art are briefly introduced below. Obviously, the drawings in the following description merely illustrate some embodiments of the invention, and those skilled in the art may obtain other drawings according to the structures shown in the following drawings without creative labor.

The invention will be further described below in conjunction with accompanying drawings and embodiments.

DETAILED DESCRIPTION OF THE INVENTION

Figure 1:
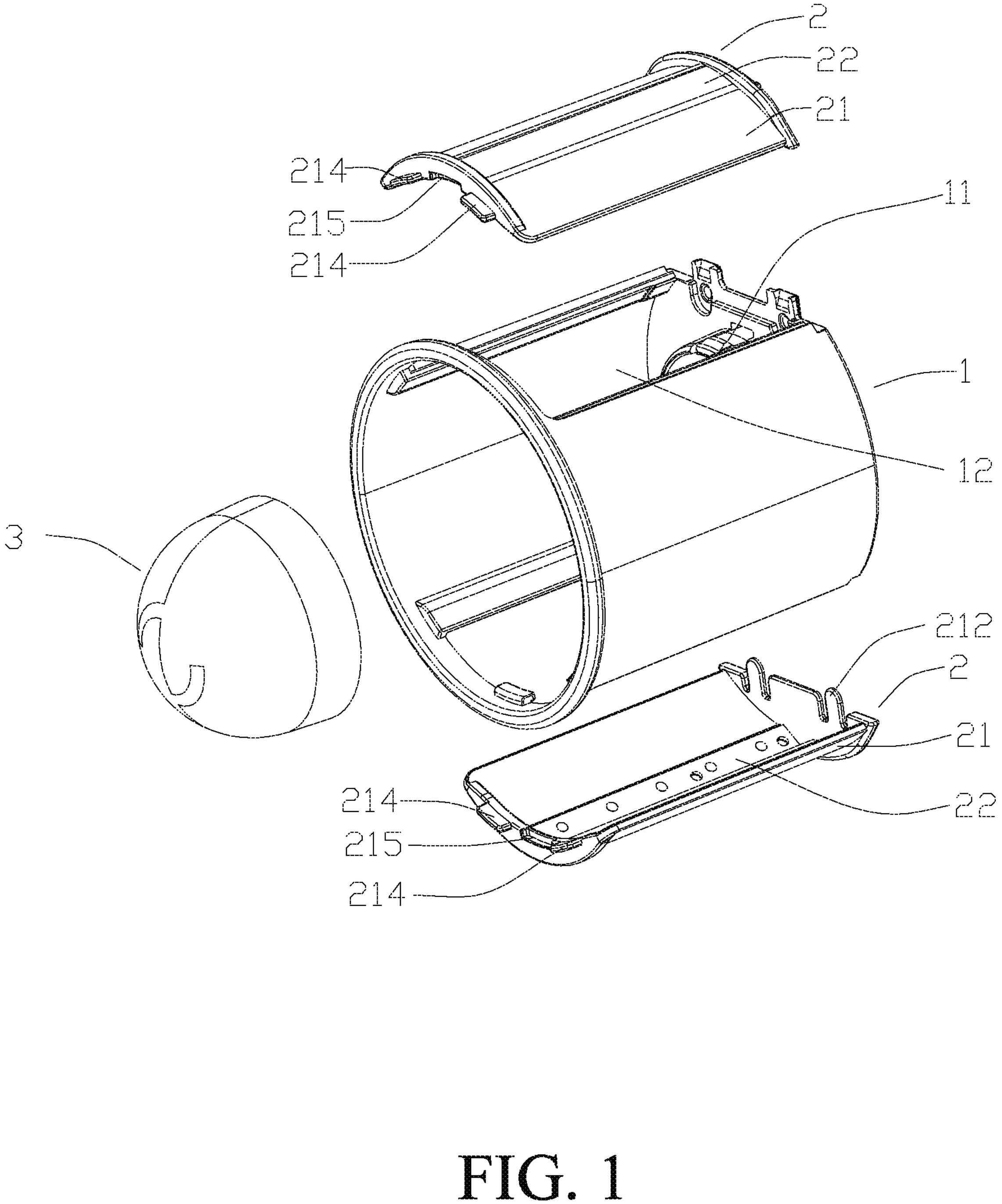
FIG. 1 is an exploded structural view of a roller tool and a roller vegetable cutter according to one embodiment of the invention.

Many different embodiments or examples are provided in the following disclosure to implement different solutions of the invention.

Referring to FIG. 1 to FIG. 6, the invention provides a roller tool, comprising:

A roller body 1, wherein the roller body 1 is a cylindrical structure and comprises a roller bottom surface and a roller side face, a discharge cavity is defined by the roller bottom surface and the roller side face, an end, opposite to the roller bottom surface, of the roller body 1 is open to form an outlet, a connecting part 11 which protrudes towards the outlet is disposed in the middle of the roller bottom surface, and multiple mounting parts 12 are disposed on the roller side face;

Multiple blade assemblies 2, wherein the multiple roller assemblies 2 are detachably mounted in the multiple mounting parts 12, lower ends of the blade assemblies 2 are clamped at ends, close to the outlet, of the mounting parts 12, second mounting surfaces 211 are disposed at upper ends of the blade assemblies 2, first clamping parts 212 are disposed at two ends of each first mounting surface 211, clamping protrusions 2121 are disposed on the first clamping parts 212, blade holder mounting surfaces 14 are disposed on an inner wall of the roller bottom surface, clamping grooves 1411 are formed in two sides of each blade holder mounting surface 14, and the blade assemblies 2 are mounted on the roller body 1 through the cooperation of the clamping protrusions 2121 and the clamping grooves 1411; and A guide part 3, wherein the guide part 3 is disposed in the discharge cavity and connected to the connecting part 11 and is a hemispherical or cylindrical structure, and the guide part 3 and the roller body 1 are located on a same axis.

In this embodiment, the roller body 1 is a cylindrical structure, thus being simple in structure and easy to machine; the guide part 3 is disposed in the roller body, the bottom of the guide part 3 faces the outlet, the surface of the guide part 3 is smooth, and the guide part 3 is a hemispherical structure, such that cut vegetables can fall to the guide part 3 under the action of gravity and then slide to the outlet of the roller body 1 along the arc-shaped surface of the hemispherical structure; the guide part 3 and the roller body 1 are located on the same axis, such that cut vegetables can smoothly fall to the surface of the guide part 3 from any angles and then slide to the outlet along the guide part 3 in the rotating process, thus improving the vegetable discharge capacity of the roller tool, preventing vegetables getting stuck in the roller tool, and improving the cutting efficiency of a roller vegetable cutter; the mounting parts 12 are disposed on the roller side face, and two or more blade assemblies 2 are disposed on the roller side face and are detachably mounted on the mounting parts 12 on the roller side face, such that the blade assemblies 2 can be changed conveniently, and the situation where the whole roller tool has to be changed due to damage of the blade assemblies 2 is avoided; preferably, the blade assemblies 2 of different structures may be used to shred, slice or chop vegetables or cut vegetables into other shapes; the blade assemblies 2 may be replaced with blade assemblies of different structures according to the use requirements of users, so compared with traditional integrated tool which can cut vegetables in only one form, the vegetable cutting forms are enriched, and more cooking requirements of users are met.

Figure 4:
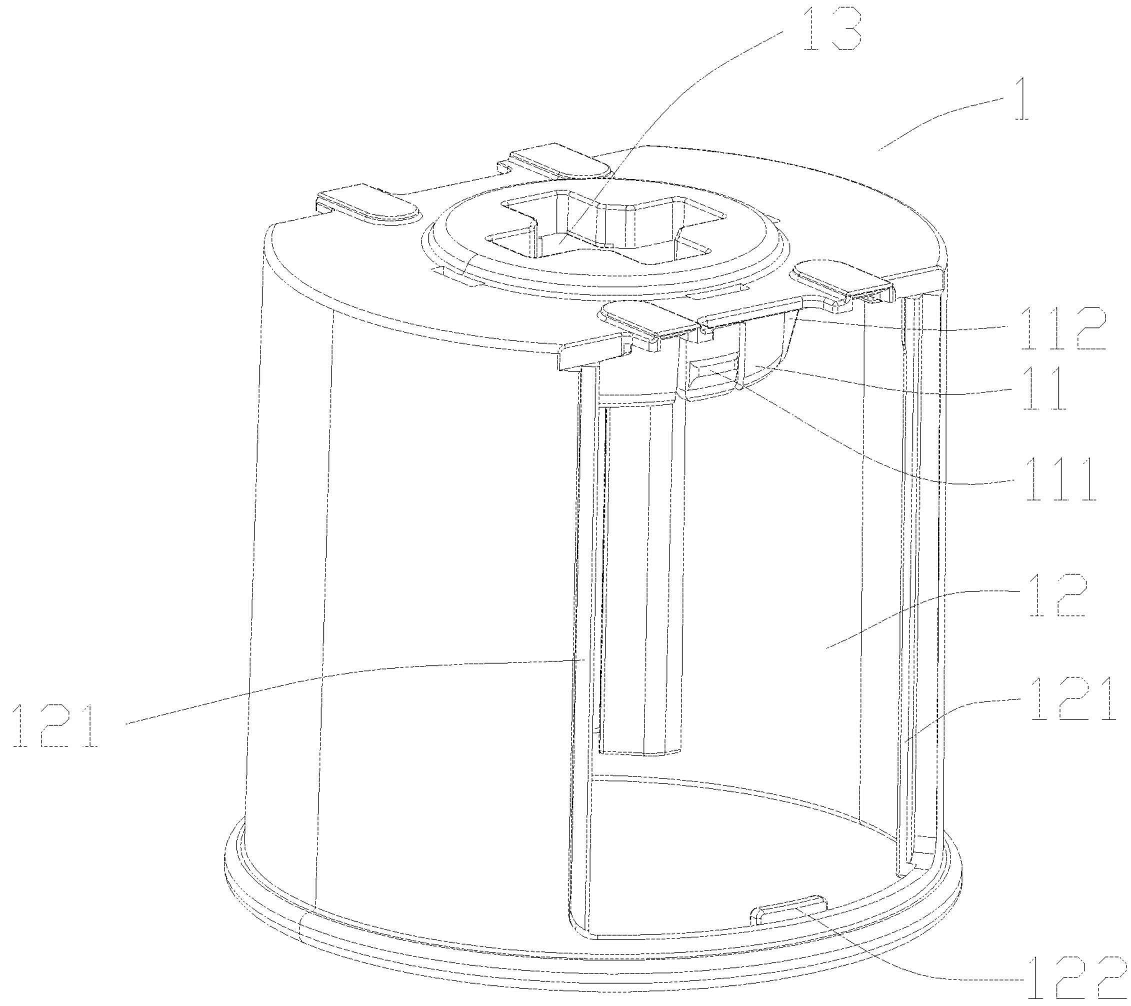
FIG. 4 is a structural view of a roller body of the roller tool and the roller vegetable cutter according to one embodiment of the invention.
Figure 6:
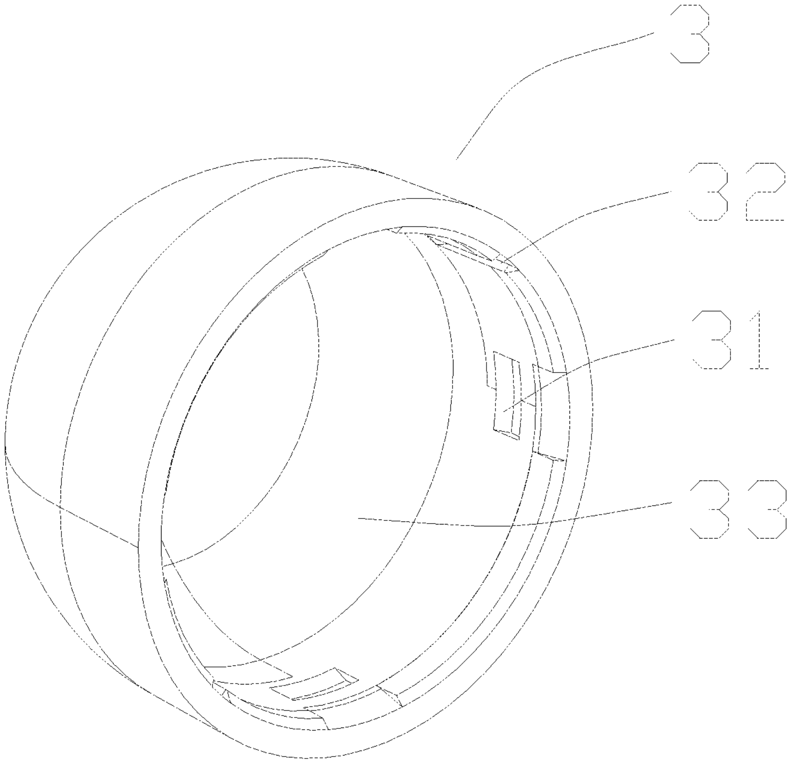
FIG. 6 is a structural view of a guide part of the roller tool and the roller vegetable cutter according to one embodiment of the invention.

In one embodiment of the invention, referring to FIG. 4 and FIG. 6, the guide part 3 is provided with a cavity 33, which is connected to the connecting part 11 and gives way to the connecting part 11, a plurality of first clamping recesses 31 are formed in an upper portion of an inner wall of the cavity 33, a plurality of first clamping parts 111 are disposed on an outer wall of the connecting part 11, and the guide part 3 is connected to the connecting part 11 through the cooperation of the first clamping recesses 31 and the first clamping parts 111.

In this embodiment, the connecting part 11 is a cylindrical structure which protrudes towards the outlet, the diameter of the outer wall of the connecting part 11 matches the diameter of the inner wall of the cavity 33 of the guide part 3, four first clamping recesses 31 are formed in the upper portion of the inner wall of the cavity 33 and are arranged in an array along the inner wall of the cavity 33, four first clamping parts 111 matched with the four first clamping recesses 31 are disposed on the outer wall of the connecting part 11, and further, the two sides of each first clamping part 111 are hollowed out, such that the first clamping parts 111 can deform elastically to some extent, which is beneficial to assembly and disassembly of the guide part 3; when the guide part 3 is assembled, the protrusive connecting part 11 is inserted into the cavity 33 of the guide part 3 to enable the four first clamping parts 111 on the outer wall of the connecting part 11 to be clamped in the first clamping recesses 31 respectively, such that the guide part 3 and the connecting part 11 are stably connected. Specifically, at least one limit block 112 is disposed on the outer wall of the connecting part 11, at least one limit groove 32 is formed in the inner wall of the cavity 33 of the guide part 3, and the limit block 112 can be inserted into the limit groove 32 to further limit the guide part 3, such that the guide part 3 and the connecting part 11 can be connected more stably, and are not prone to rotating or moving relative to each other.

Figure 3:
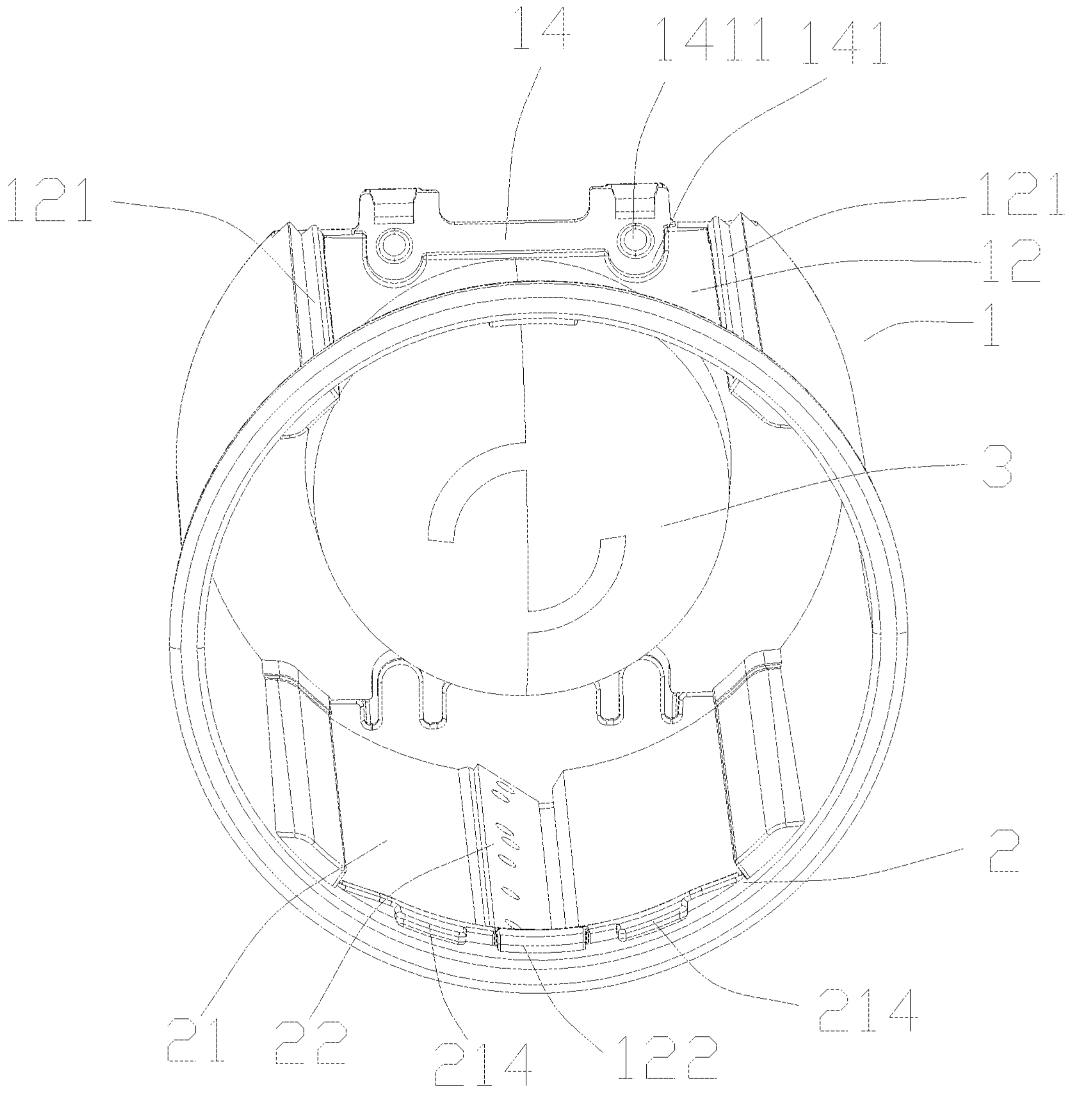
FIG. 3 is a structural view of the roller tool and the roller vegetable cutter with one blade assembly being hidden according to one embodiment of the invention.
Figure 5:
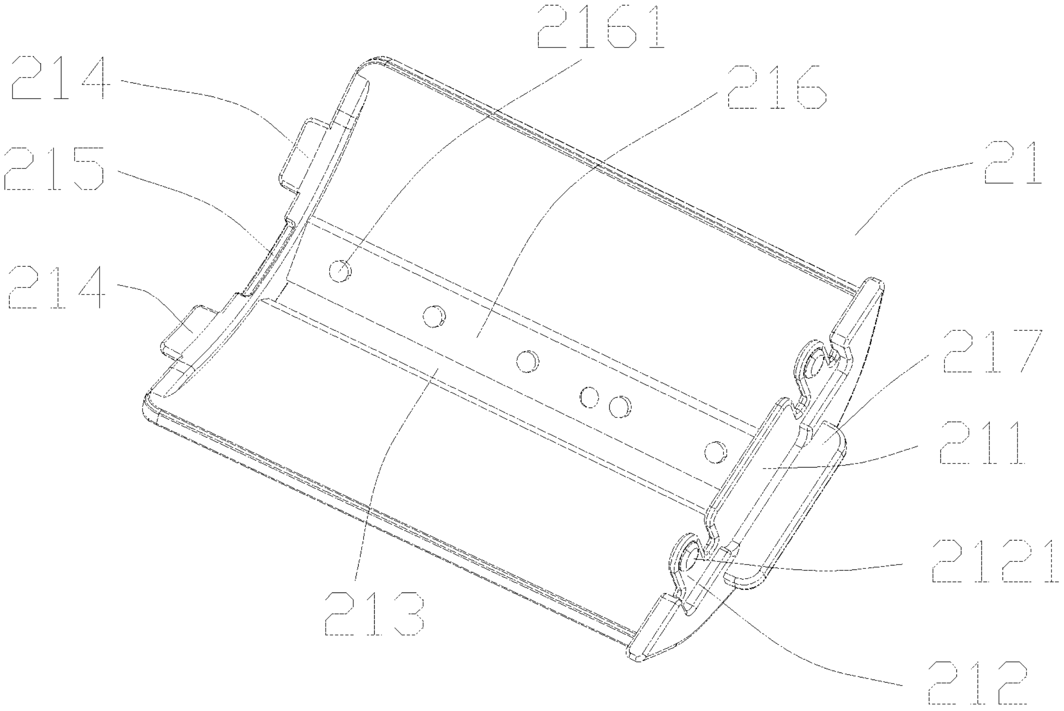
FIG. 5 is a structural view of a blade holder of the roller tool and the roller vegetable cutter according to one embodiment of the invention.

In one embodiment of the invention, referring to FIG. 3 and FIG. 5, each blade assembly 2 comprises a blade holder 21 and a blade 22, wherein a cutting notch 213 with a height difference is formed in the middle of the blade holder 21, the blade 22 is mounted in the cutting notch 213, and the length of the cutting notch 213 matches that of the blade 22.

In this embodiment, the blade assembly 2 is of a separate structure, specifically, the blade assembly 2 comprises the blade holder 21 and the blade 22, and the cutting notch 213 with a height difference is formed in the middle of the blade holder 21, such that vegetables can be cut conveniently and can smoothly enter the discharge cavity after being cut; an oblique first mounting surface 216 is formed on an upper surface of the cutting notch 213, a plurality of clamping protrusions 2161 used for mounting the blade 22 are disposed on the first mounting surface 216, a plurality of mounting holes are formed in the blade 22, and the blade 22 is mounted and fixed on the first mounting surface 216 through the cooperation of the clamping protrusions 2161 and the mounting holes, such that the structure is simple and ingenious, and the blade 22 can be assembled safely and flexibly. Specifically, an oblique cutting edge is formed at one end of the blade 22, and the cutting edge stretches out of the first mounting surface 216 after the blade 22 is assembled. Further, a lower surface of the cutting notch 213 inclines inwards.

Figure 2:
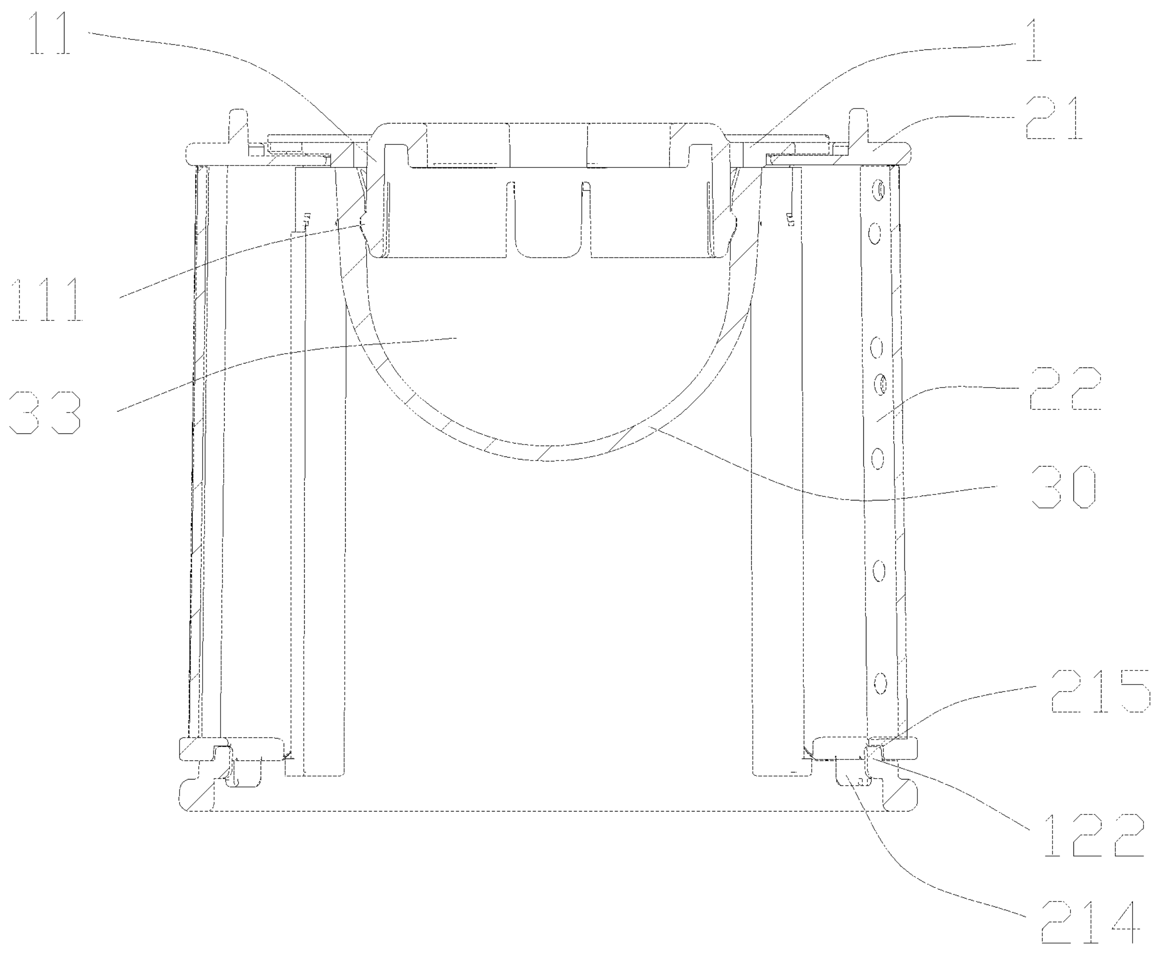
FIG. 2 is a sectional view of the roller tool and the roller vegetable cutter according to one embodiment of the invention.

In one embodiment of the invention, referring to FIG. 1, FIG. 2 and FIG. 3, a limit protrusion 122 is disposed in the middle of an end, close to the outlet, of each mounting part 12, a notch 215 matched with the limit protrusion 122 is formed in one end of each blade holder 21, and protrusive parts 214 abutting against an inner wall of the roller side face of the roller body 1 are disposed on two sides of the notch 215 respectively.

In this embodiment, the limit protrusion 122 is disposed in the middle of the end, close to the outlet, of each mounting part 12 and is disposed on the roller body 1 through an integral injection molding process, the notch 215 matched with the limit protrusion 122 is formed in one end of each blade holder 21, and the protrusive parts 214 abutting against the inner wall of the roller side face of the roller body 1 are disposed on the two sides of the notch 215 respectively. When the blade assembly is installed, the blade holder 21 is placed obliquely, the notch 215 in one end of the blade holder 21 is placed on the protrusive parts 214 and matched with the protrusive parts 214, the protrusive parts 214 at the two ends of the notch 215 stretch into the discharge cavity along the mounting part 12 to abut against the inner wall of the roller side face of the roller body 1, such that the mounting part 12 and one end of the blade assembly 2 are clamped together.

In one embodiment of the invention, referring to FIG. 3 and FIG. 5, blade holder mounting surfaces 14 are disposed on the inner wall of the roller bottom surface, guide slots 141 are formed in two sides of each blade holder mounting surface 14 respectively, clamping grooves 1411 are formed in the guide slots 141, a first mounting surface 211 is disposed at one end of each blade holder 21, second clamping parts 212 matched with the guide slots 141 are disposed on the first mounting surface 211, clamping protrusions 2121 matched with the clamping grooves 1411 are disposed on the second clamping parts 212, and the second mounting surfaces 211 abut against the blade holder mounting surfaces 14.

In this embodiment, the blade holder mounting surfaces 14 are disposed on the inner wall of the roller bottom surface, the guide slots 141 are formed in the two sides of each blade holder mounting surface 14 respectively, and the clamping grooves 1411 are formed in the guide slots 141, wherein the blade holder mounting surfaces 14 and the guide slots 141 are formed by recesses in the inner wall of the roller bottom surface. When the blade assembly 2 and the mounting part 12 are assembled, the second clamping parts 212 enters the guide slots 141 along the mounting part 12; and when the second clamping parts 212 abut against protrusions at the bottom of the guide slots 141, the clamping protrusions 2121 are clamped in the clamping grooves 1411, and the first mounting surface 211 abuts against the blade holder mounting surface 14, such that the blade assembly 2 and the mounting part 12 are assembled. Specifically, the two sides of the second clamping parts 212 are hollowed out, such that the second clamping parts 212 can deform elastically to some extent, and the blade assembly 2 can be assembled and disassembled conveniently. Further, a pulling lug 217 is disposed above the first mounting surface 211, and the blade assembly 2 can be pushed or pulled through the pulling lug 217 to be assembled on or detached from the mounting part 12.

In one embodiment of the invention, referring to FIG. 3, second mounting surface 121 are disposed on two sides of each mounting part 12 respectively, and the second mounting surface 121 abut against two side edges of the corresponding blade holder 21 to support and limit the blade holder 21.

In this embodiment, the two side edges of the blade holder 21 are bent inwards to form abutting edges, and outer walls of the abutting edges incline inwards to ensure that the width of side edges of the abutting edges is less than that of the corresponding portions of the second mounting surface 121 disposed on the two sides of the mounting part 12, such that when the blade assembly 2 is mounted on the mounting part 12, the abutting edges on the two sides of the blade holder 21 are entirely located in the mounting part 12, the lower ends of the abutting edges abut against the second mounting surface 121, and the outer sides of the abutting edges abut against the two side walls of the mounting part 12; the second mounting surface 121 and the two side edges of the blade holder 21 are bent inwards to form abutting edges to support and limit the blade holder 21, such that the blade assembly 2 can be mounted in the mounting part 12 more stably, and the blade holder 21 will not fall from the mounting part 12; and the radian of the bent blade holder 21 matches the radian of the roller side face, such that the roller body 1 and the blade assemblies 2 form a cylinder which is simple and aesthetic.

In one embodiment of the invention, referring to FIG. 4, a mounting groove 13 allowing a rocker arm assembly of a roller vegetable cutter to be clamped therein is formed in the roller bottom surface, and the mounting groove 13 is a cross-shaped structure.

In a second aspect, one embodiment of the invention provides a roller vegetable cutter, which comprises a vegetable cutter body, a roller tool, a rocker arm assembly and a feed cylinder, wherein the vegetable cutter body is provided with a mounting cavity, the roller tool is mounted in the mounting cavity, the feed cylinder is disposed above the mounting cylinder, and a mounting groove 13 in a roller bottom surface of the roller tool is connected to the rocker arm assembly. When the roller vegetable cutter is used, vegetables are placed in the feed cylinder first, then the rocker arm assembly is rotated to drive the roller tool to rotate in the mounting cavity, blade assemblies 2 on a roller side face cut the vegetables, then the cut vegetables fall onto a guide part 3 in a discharge cavity, the guide part 3 is a hemispherical structure, and the vegetables can slide out of an outlet of a roller body along an arc-shaped surface of the hemispherical structure, so the whole vegetable cutting process is completed.

What is claimed is:

1. A roller tool, comprising:

a roller body (1), wherein the roller body (1) is a cylindrical structure, and comprises a roller bottom surface and a roller side face, a discharge cavity is defined by the roller bottom surface and the roller side face, an end, opposite to the roller bottom surface, of the roller body (1) is open to form an outlet, a connecting part (11) protruding towards the outlet is disposed in a middle of the roller bottom surface, and multiple mounting parts (12) are disposed on the roller side face;

multiple blade assemblies (2), wherein the multiple blade assemblies (2) are detachably mounted in the multiple mounting parts (12), lower ends of the multiple blade assemblies (2) are clamped at ends, close to the outlet, of the multiple mounting parts (12), a first mounting surfaces (211) are disposed at upper ends of the multiple blade assemblies (2), first clamping parts (212) are disposed at two ends of each of the second mounting surface (211), clamping protrusions (2121) are disposed on the first clamping parts (212), blade holder mounting surfaces (14) are disposed on an inner wall of the roller bottom surface, clamping grooves (1411) are formed in two sides of each of the blade holder mounting surface (14), and the multiple blade assemblies (2) are mounted on the roller body (1) through a cooperation of the clamping protrusions (2121) and the clamping grooves (1411); and a guide part (3), wherein the guide part (3) is disposed in the discharge cavity and connected to the connecting part (11) and is a hemispherical or cylindrical structure, and the guide part (3) and the roller body (1) are located on a same axis.

2. The roller tool according to claim 1, wherein the guide part (3) is provided with a cavity (33), which allows the connecting part (11) to be clamped therein and gives way to the connecting part (11), a plurality of first clamping recesses (31) are formed in an upper portion of an inner wall of the cavity (33), a plurality of first clamping parts (111) are disposed on an outer wall of the connecting part (11), and the guide part (3) is connected to the connecting part (11) through the cooperation of the plurality of first clamping recesses (31) and the first clamping parts (111).

3. A roller vegetable cutter, comprising the roller tool according to claim 2.

4. The roller tool according to claim 1, wherein each of the blade assembly (2) comprises a blade holder (21) and a blade (22), a cutting notch (213) with a height difference is formed in a middle of the blade holder (21), the blade (22) is mounted in the cutting notch (213), and a length of the cutting notch (213) matches that of the blade (22).

5. The roller tool according to claim 4, wherein an oblique first mounting surface (216) is formed on an upper surface of the cutting notch (213), a plurality of clamping protrusions (2161) used for mounting the blade (22) are disposed on the oblique first mounting surface (216), a plurality of mounting holes are formed in the blade (22), and the blade (22) is mounted and fixed on the oblique first mounting surface (216) through a cooperation of the plurality of clamping protrusions (2161) and the mounting holes.

6. A roller vegetable cutter, comprising the roller tool according to claim 5.

7. The roller tool according to claim 4, wherein a limit protrusion (122) is disposed in a middle of an end, close to the outlet, of each of the multiple mounting part (12), a notch (215) matched with the limit protrusion (122) is formed in an end of each of the blade holder (21), and protrusive parts (214) abutting against an inner wall of the roller side face of the roller body (1) are disposed on two sides of the notch (215) respectively.

8. A roller vegetable cutter, comprising the roller tool according to claim 4.

9. The roller tool according to claim 4, herein the blade holder mounting surfaces (14) are disposed on the inner wall of the roller bottom surface, guide slots (141) are formed in the two sides of each of the said blade holder mounting surface (14) respectively, and clamping grooves (1411) are formed in the guide slots (141).

10. A roller vegetable cutter, comprising the roller tool according to claim 9.

11. The roller tool according to claim 4, wherein a second mounting surfaces (121) are disposed on two sides of each of the multiple mounting part (12), and abut against two side edges of the corresponding blade holder (21) to support and limit the blade holder (21).

12. A roller vegetable cutter, comprising the roller tool according to claim 11.

13. A roller vegetable cutter, comprising the roller tool according to claim 7.

14. The roller tool according to claim 1, wherein a mounting groove (13) allowing a rocker arm assembly of a roller vegetable cutter to be clamped therein is formed in the roller bottom surface, and the mounting groove (13) is a cross-shaped structure.

15. A roller vegetable cutter, comprising the roller tool according to claim 14.

16. A roller vegetable cutter, comprising the roller tool according to claim 1.

* * * * *